(12) United States Patent
Miyama

(10) Patent No.: US 9,364,758 B2
(45) Date of Patent: Jun. 14, 2016

(54) AUTOMATIC MOVEMENT OF A GAME CHARACTER IN A PROTECTED STATE

(71) Applicant: NINTENDO CO., LTD., Minami-ku, Kyoto (JP)

(72) Inventor: Satoshi Miyama, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 130 days.

(21) Appl. No.: 14/202,515

(22) Filed: Mar. 10, 2014

(65) Prior Publication Data

US 2015/0099581 A1    Apr. 9, 2015

(30) Foreign Application Priority Data

Oct. 4, 2013    (JP) .................................. 2013-209277

(51) Int. Cl.
    *A63F 9/24*    (2006.01)
    *A63F 13/56*    (2014.01)
    *A63F 13/58*    (2014.01)

(52) U.S. Cl.
    CPC *A63F 13/56* (2014.09); *A63F 13/58* (2014.09)

(58) Field of Classification Search
    CPC ..... A63F 13/10; A63F 2300/64; A63F 13/00; A63F 13/12; A63F 13/56
    See application file for complete search history.

(56) References Cited

U.S. PATENT DOCUMENTS

| | | | |
|---|---|---|---|
| 8,282,454 B2 | 10/2012 | Miyamoto et al. | |
| 2002/0115483 A1* | 8/2002 | Fujiwara | A63F 13/10 463/7 |
| 2006/0094502 A1* | 5/2006 | Katayama | A63F 13/10 463/31 |
| 2012/0077585 A1* | 3/2012 | Miyamoto | A63F 13/10 463/31 |

* cited by examiner

*Primary Examiner* — Steve Rowland
(74) *Attorney, Agent, or Firm* — Nixon & Vanderhye P.C.

(57) ABSTRACT

An information processing device is configured to execute: setting a protective state for protecting a character from a danger in a game; setting a moving direction of the character in the protective state to a predetermined direction; detecting that the character in the protective state is overlapping with an obstacle in a virtual world; and correcting the moving direction that has been set by the action setting when the obstacle is detected.

14 Claims, 13 Drawing Sheets

AUTOMATIC MOVEMENT OF A GAME CHARACTER IN A PROTECTED STATE

CROSS REFERENCE TO RELATED APPLICATION

This application is based upon and claims the benefit of priority of the prior Japanese Patent Application No. JP2013-209277, filed on Oct. 4, 2013, the entire contents of which are incorporated herein by reference.

FIELD

The present disclosure relates to game processing that involves movement in a virtual world.

BACKGROUND AND SUMMARY

Conventionally, in a game involving movement in a virtual world, there is a technique to set a protective state for protecting a character from a danger in a game, and move the character in the protective state according to the movement of the other characters.

However if the moving direction of the character in the protective state is determined according to the movement of the other characters, such as a leading character, the character in the protective state may remain for a long time in a position which is not appropriate for cancelling the protective state in the virtual world of the game, and a state where the game cannot be played may continue for a long time even if the protective state is cancelled, or a state where the protective state cannot be cancelled may continue for a long time.

An aspect of the present disclosure is a game program for causing a computer of a game machine to execute: performing game processing including movement of one or a plurality of characters in a virtual world; setting a protective state for protecting at least one character from a danger in a game when predetermined conditions are satisfied; setting a moving direction of the character in the protective state to a predetermined direction; detecting that the character in the protective state is overlapping with an object which obstructs the movement in the virtual world; and correcting the moving direction which has been set by the moving direction setting when the detecting detects the obstacle state.

The present disclosure can be understood as a game machine, a game system, a game processing method executed by a computer, or as a game program for a computer to execute. The present disclosure can also be understood as a program stored in a recording medium that a computer, a device, a machine or the like can read. Here the recording medium that a computer or the like can read refers to a recording medium which stores such information as data and programs electrically, magnetically, optically, mechanically or by chemical action, and which is read by a computer or the like.

DETAILED DESCRIPTION OF NON-LIMITING EXAMPLE EMBODIMENTS

Embodiments of the present disclosure will now be described with reference to the drawings.

<Configuration of Device>

Figure 1:
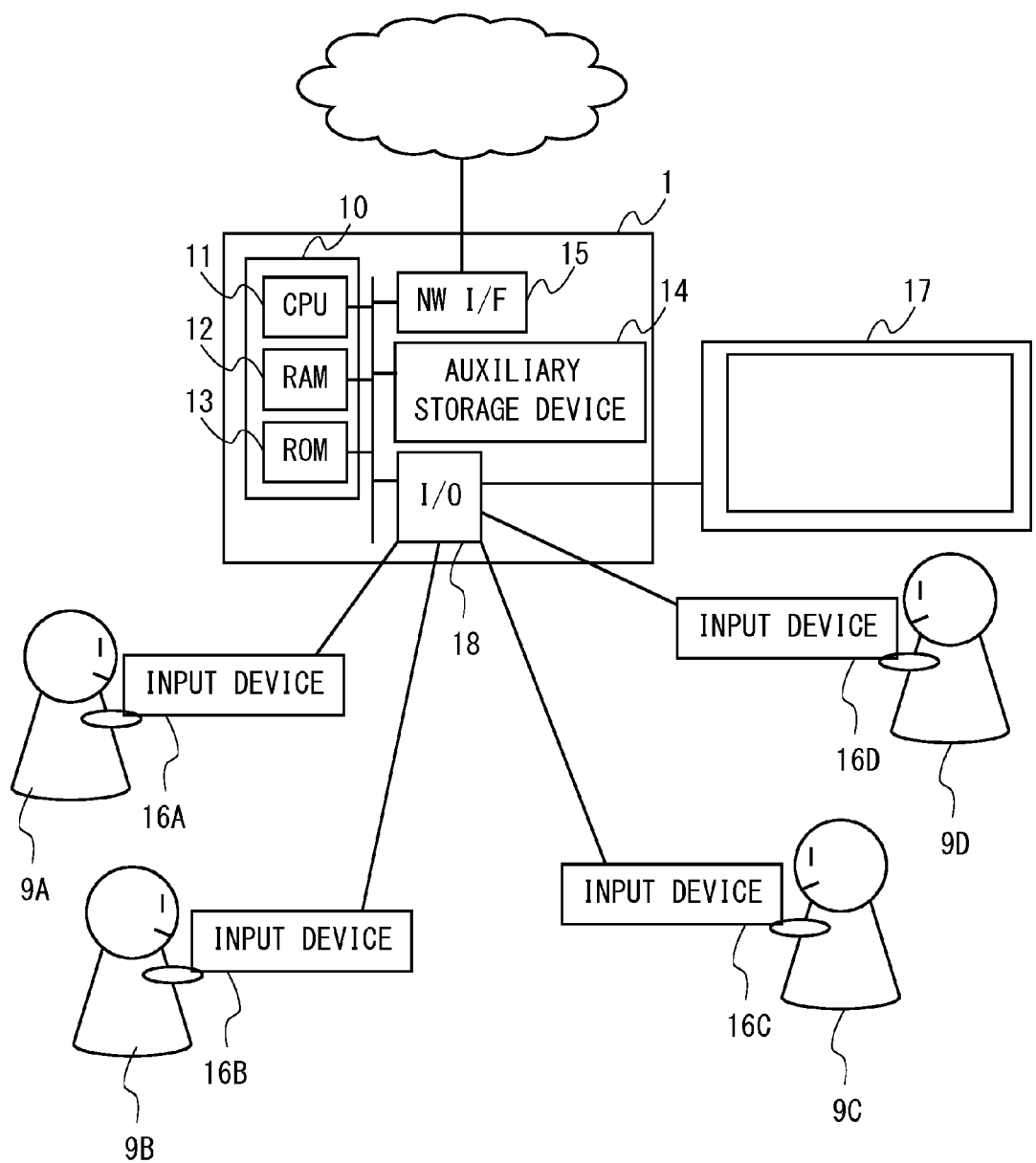
FIG. 1 is a diagram depicting a general hardware configuration of an information processing device according to an embodiment.

FIG. 1 is a diagram depicting a general hardware configuration of an information processing device 1 according to the embodiments. The information processing device 1 is an information processing device where a central processing unit (CPU) 11, a random access memory (RAM) 12, a read only memory (ROM) 13, an auxiliary storage device 14, and a network interface 15 for communicating with the outside via a network are electrically connected. The input devices 16A, 16B, 16C and 16D and an output device 17 are connected to the information processing device 1 via an input/output interface 18. For the concrete hardware configuration of the information processing device 1, composing elements may be omitted, replaced or added as necessary according to the embodiment.

The information processing device 1 is a game machine used by a player 9. For the game machine, various types of devices can be used, such as a stationary game machine, a portable game machine, a personal computer, a smartphone, a tablet, and a wearable electronic device, but the type of the device is not limited. The player 9 can play a game by allowing the information processing device 1 to execute game processing based on a game program. In this embodiment, a single information processing device is used as an example of a configuration to carry out the present disclosure, but the present disclosure may be realized as a system having a plurality of devices which are interconnected via a network.

The CPU 11 is a central processing unit which controls each composing element installed in the information processing device 1, such as a RAM 12 and an auxiliary storage device 14, by processing commands and data developed in the RAM 12 and the ROM 13. The RAM 12 is a main storage device and is controlled by the CPU 11, and various commands and data are written to or read from the RAM 12. In other words, the CPU 11, the RAM 12 and the ROM 13 constitute a control unit 10 of the information processing device 1.

The auxiliary storage device 14 is a non-volatile storage device, where information that should be saved after turning the power of the information processing device 1 OFF, such as the operating system (OS) of the information processing device 1 that is loaded to the RAM 12, various programs for executing the processing to be described later, and various data used by the information processing device 1, are written and read. For the auxiliary storage device 14, an electrically erasable programmable ROM (EEPROM) and a hard disk drive (HDD) or the like can be used. Further, for the auxiliary storage device 14, a portable removable medium that can be installed in the information processing device 1 may be used. Examples of the portable medium is a memory card using EEPROM, a compact disc (CD), a digital versatile disc (DVD) and a Blu-ray® Disc (BD). A portable auxiliary storage device 14 and a non-portable auxiliary storage device 14 may be used in combination.

In this embodiment, the four input devices 16A, 16B, 16C and 16D, which the four players 9A, 9B, 9C and 9D can hold and operate respectively, are connected to the information processing device 1. But the number of players 9 who can play a game and the number of input devices 16 are not limited. Hereafter, any of the symbols A to D are attached to distinguish the four players 9 from each other, the four input devices 16 from each other, and the four player characters 41 corresponding thereto from each other, and if distinguishment is not necessary, the player 9, the input device 16 and the player character 41 are simply used without attached symbols.

For the input device 16, various devices can be used, such as a button, a lever, a keyboard, an acceleration sensor, an angular velocity sensor and a touch panel. The touch panel may be laminated onto a display (touch panel display). The player 9 can carry out input by touching the surface of the touch panel using a touch pen, a finger or the like. For the touch panel, a resistance film type touch panel, electrostatic capacitance type touch panel or any other type of touch panel may be used.

The output device 17 is a device for outputting an image, sound or the like so as to be recognized by the player 9, and as an output device for images, a display device 17 using liquid crystals or organic ELs for example is used. In this embodiment, a display device 17 which displays images on a position that can be recognized by all four players 9A, 9B, 9C and 9D will be primarily described as the output device 17.

Figure 2:
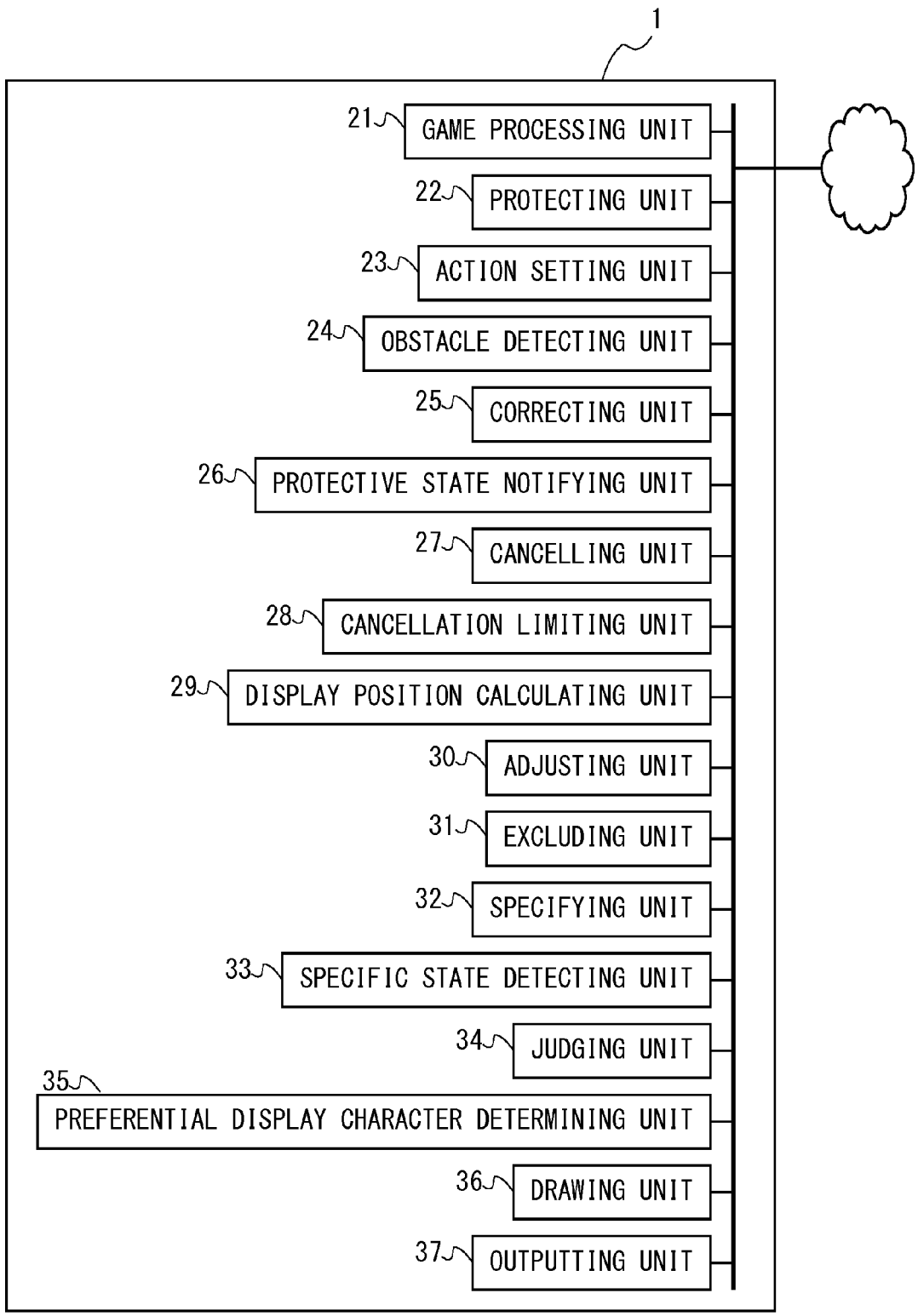
FIG. 2 is a diagram depicting a functional configuration of the information processing device according to the embodiment.

FIG. 2 is a diagram depicting a general functional configuration of the information processing device 1 according to this embodiment. By the CPU 11 interpreting and executing various programs developed in the RAM 12, the information processing device 1 according to this embodiment functions as an information processing device including a game processing unit 21, a protecting unit 22, an action setting unit (moving direction setting unit) 23, an obstacle detecting unit 24, a correcting unit 25, a protective state notifying unit 26, a cancelling unit 27, a cancellation limiting unit 28, a display position calculating unit 29, an adjusting unit 30, an excluding unit 31, a specifying unit 32, a specific state detecting unit 33, a judging unit 34, a preferential display character determining unit 35, a drawing unit 36 and an outputting unit 37. In this embodiment, an example of the general purpose CPU 11 executing all functions is described, but a part or all of these functions may be implemented by one or a plurality of dedicated processor(s). Each functional unit of the information processing device 1 may exist on a cloud, or installed on a server 3 or the like. These functional units may be implemented not by one software program but by a plurality of software programs.

The game processing unit 21 performs game processing including actions of a plurality of characters in the virtual world of the game (e.g. movement, attacking action and defensive action of the characters in the virtual world) according to the player operation, by executing a game program while reflecting the input operation from the players 9A to 9D via the input devices 16A, 16B, 16C and 16D in various parameters of the game program. Normally the player operation via the input device 16 influences the action of the player character 41 assigned to the input device 16 and the player 9 thereof. In other words, the input carried out by the player 9A by operating the input device 16A influences the action of the player character 41A, and the input carried out by the player 9B by operating the input device 16B influences the action of the player character 41B. This is also the same in the case of the input devices 16C and 16D. In this embodiment, a game that uses a three-dimensional virtual space as the virtual world is described, but a two-dimensional map may be used for the virtual world.

The protecting unit 22 sets at least one character to a protective state, where the character is protected from a danger in the game, when predetermined conditions are satisfied. For example, when a protective operation by a player 9 is detected, the protecting unit 22 sets the character 41 of the player who executed the protective operation to the protective state.

The action setting unit (moving direction setting unit) 23 sets an action (including a moving direction) of a character in the virtual world of the game. Here an action of a character who is not in the protective state is set according to the player operation that is inputted via the input device 16, but a moving direction of a character who is in the protective state is set to a direction in which another character located in the leading position exists, for example. The moving direction of the protective state character, however, may be a direction to a character other than the leading character.

The obstacle detecting unit 24 detects a state when a character in the protective state is overlapping with an object that obstructs movement of the character in the virtual world.

When the obstacle detecting unit 24 detects an obstacle state, the correcting unit 25 corrects the moving direction of the protective state character in a direction to cancel the detected overlap with the obstacle (object in the virtual world). As the direction to cancel the overlap with the obstacle, this embodiment uses a direction combining a direction toward outside the obstacle on the normal line of a boundary surface closest to the protective target character, out of the boundary sources of the detected object, and a direction that is set by the action setting unit 23. The "direction toward outside the obstacle on the normal line of a boundary surface closest to the protective target character" is a direction in which an overlap with the obstacle-object can be cancelled in the shortest time, and a direction toward a position closest to the current position of the protective state character, out of the positions where the overlap with the obstacle object is cancelled. By using this direction as the correction direction, the protective state character can cancel the overlap with the object in a relatively short moving distance and in a relatively short time.

The protective state notifying unit 26 allows the player 9 to recognize that the character is in the protective state. The content outputted by the protective state notifying unit 26 is different between the period when the obstacle detecting unit 24 is executing detection and a period when the obstacle detecting unit 24 is not executing detection. The protective state notifying unit 26 notifies the protective state to the player 9 by attaching a predetermined effect to the display of the character, where an effect which makes it difficult to visually recognize the character is attached while the obstacle detecting unit 24 is executing detection, and an effect which makes it easy to visually recognize the character is attached while the obstacle detecting unit 24 is not executing detection.

The cancelling unit 27 cancels the protective state. For example, when the cancellation operation by the player 9 is detected, the cancelling unit 27 cancels the protective state.

The cancellation limiting unit 28 limits cancellation of the protective state by the cancelling unit 27 while the obstacle detecting unit 24 is executing detection.

The display position calculating unit 29 calculates the display positions of the objects including the characters when a three-dimensional virtual space is displayed using the display device 17.

Referring to the display positions calculated by the display position calculating unit 29, the adjusting unit 30 adjusts drawing related parameters in the beginning so that all of the plurality of characters enter a predetermined area 45 of the display image 40. If all of the plurality of characters cannot enter the predetermined area 45 even if the drawing related parameters are adjusted, the adjusting unit 30 adjusts the drawing related parameters so that at least the preferential display character enters the predetermined area 45. In this case, the predetermined area 45 is, for example, a predetermined area which is smaller than the entire display image 40, and is set in a position including the center of the entire display image 40, for example. The shape of the predetermined area 45 is not limited to a rectangle, as illustrated in this embodiment.

The excluding unit 31 excludes a character under a predetermined state in the game processing, from the adjustment targets by the adjusting unit 30. In this embodiment, a character which cannot be operated by the player is excluded from the adjustment targets by the adjusting unit 30.

The specifying unit 32 specifies a leading character which is closest to the goal 42 of the game among a plurality of characters, based on the positional relationship of the plurality of characters with respect to the progress route 43 of the game in the virtual world, and specifies this leading character as a specific character. In this embodiment, the leading character is specified as the specific character, but the specific character can be determined according to the conditions which are set in advance based on the content of the game, and need not be the leading character. For example, in a game where a plurality of players 9 cooperate with each other and a player 9 to be a leader has been determined, the leading player character 41 may be specified as the specific character.

The specific state detecting unit 33 detects a game state which requires preferential display of a specific character. For example, when the specific character is within a predetermined range from a goal 42 of the game, the specific state detecting unit 33 detects a state which requires preferential display of the specific character.

The judging unit 34 judges whether there is commonality in actions, which are different from that of the specific character and are performed by a plurality of non-specific characters which are the characters other than the specific character. To determine such commonality, the judging unit 34 compares a first evaluation value including an integrated value of values on the basis of an action of the specific character and a value on the basis of an action of a non-specific character that is similar to the action of the specific character, and a second evaluation value including an integrated value of values on the basis of actions of non-specific characters that are not similar to the action of the specific character, using values on the basis of respective actions of the plurality of characters, so as to judge the greater/lesser of the evaluation values.

In concrete terms, using respective velocity values of a plurality of characters moving away from a predetermined point in the display image 40, the judging unit 34 compares the first evaluation value including the integrated value of values generated by weighting the velocity of the specific character in a predetermined way, and a velocity of a non-specific character of which moving direction is similar to the specific character and a second evaluation value including an integrated value of a velocity of values of the non-specific characters of which moving directions are not similar to the specific character, so as to judge the greater/lesser of the evaluation values.

The preferential display character determining unit 35 determines the specific character as the preferential display character if the judging unit 34 does not judge that there is commonality, and determines at least that any one of the non-specific characters as the preferential display character if the judging unit 34 judges that there is commonality. However if the specific state detecting unit 33 detects the state which requires preferential display of the specific character, the preferential display character determining unit 35 determines the specific character as the preferential display character. When any one of the non-specific characters is determined as the preferential display character, the preferential display character determining unit 35 determines the preferential display character by comparing the values on the basis of the respective actions of the plurality of non-specific characters.

The drawing unit 36 draws (renders) the virtual world of the game according to the drawing related parameters that are set or adjusted.

The outputting unit 37 outputs the image drawn by the drawing unit 36 via the input/output interface 18 for the display by the display device 17.

<Processing Flow>

A processing flow to be executed in this embodiment will now be described. The concrete processing content and the processing sequence depicted in the flow chart of this embodiment are examples of carrying out the present disclosure. The concrete processing content and the processing sequence may be appropriately selected in accordance with the embodiment of the present disclosure.

Figure 3:
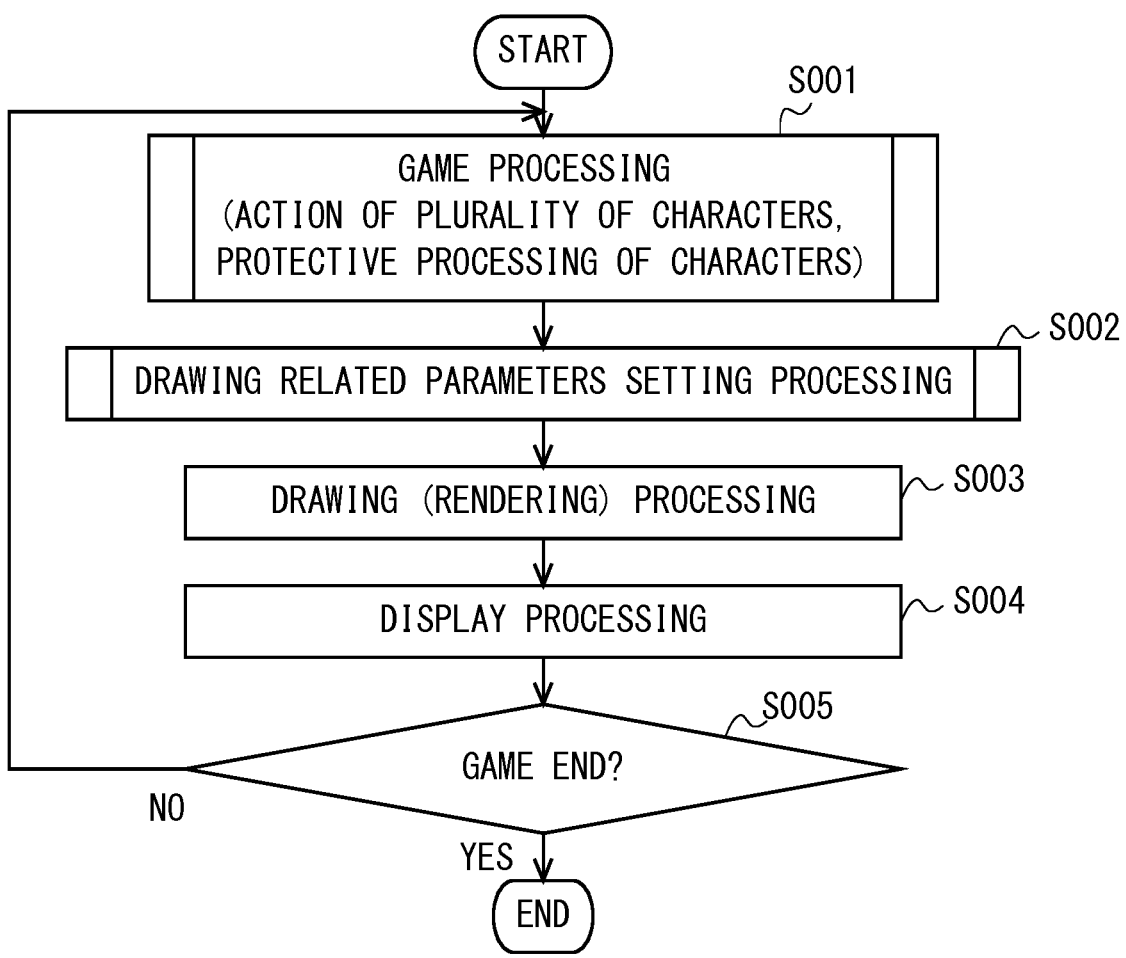
FIG. 3 is a flow chart depicting a flow of information processing according to the embodiment.

FIG. 3 is a flow chart depicting the flow of the information processing according to this embodiment. The processing depicted in this flow chart is executed in the information processing device 1 triggered by the instruction to start the game processing. The control unit 10 of the information processing device 1 loads a game program desired by the player 9 to the RAM 12 by reading from the auxiliary storage device 14 or downloading via a network, and executes this program, whereby the information processing to be described is executed. The game according to this embodiment is a game that is processed at 60 frames/second, and the processing depicted in FIG. 3 is processing that is executed repeatedly for each frame until the end of the game (step S005).

In step S001, the game processing is executed. The game processing unit 21 progresses the game processing according to the player operation that is received through the input devices 16A to 16D. The state of progress of the game is managed using the data (e.g. flags, parameters) in the game program. The game according to this embodiment is a game of targeting a goal 42 at each stage, while a plurality of characters perform actions including movement according to the player operation in a two-dimensional or a three-dimensional virtual world. The content, rules or the like of the game however are just examples, and are not limited to this embodiment. The game according to this embodiment is a multi-player game, and a plurality of characters 41A to 41D are assigned to any one of the players 9A to 9D respectively. Each of the players 9A to 9D instructs an assigned character in the game by operating the assigned input device 16A to 16D.

In the game according to this embodiment, a character enters a protective state where the character is protected from a danger in the game when a predetermined protection start condition is satisfied. In this embodiment, if a character enters the protective state, the character is not influenced by an enemy attack, a trap, a fall or the like in the game until the protective state is cancelled. Further, in this embodiment, the character in the protective state automatically follows the leading character in the game, even if the player 9 does not operate this character. The way of determining the leading character will be described later. Details on the game processing related to step S001 will be described with reference to FIG. 4 and FIG. 5. Then processing advances to step S002.

In step S002, the drawing related parameter setting processing is executed. The control unit 10 sets various parameters used for drawing (rendering) the virtual world of the game, based on such information as the positions of the plurality of characters. In the example of the game in this embodiment, a three-dimensional virtual space is used as the virtual world of the game, and the three-dimensional virtual space is rendered as a two-dimensional image, hence various parameters that are set here are parameters to determine a position, an inclination, an angle of view (imaging range) or the like in the virtual space of the virtual camera for imaging objects disposed in the virtual space. However as mentioned above, a two-dimensional map may be used as a virtual world of the game. In this case, the parameters for drawing are parameters for determining a display range in the two-dimensional map.

According to this embodiment, the game is a multi-player game in which a plurality of players 9 play while looking at the single display image 40, hence the drawing related parameters are set so that all the player characters 41 are drawn in a predetermined area 45, which is set in one display image 40 as much as possible. Details on the drawing related parameter setting processing in step S002 will be described later with reference to FIG. 8 and FIG. 9. Then processing advances to step S003.

In step S003 and step S004, the drawing processing and the display processing are executed. The drawing unit 36 draws (renders) the virtual world according to the drawing related parameters that were set in step S002, and generates the display image 40 (step S003). Then the outputting unit 37 outputs the generated display image 40 via the input/output interface 18 to allow the display device 17 to display the image (step S004). Receiving the display image 40, the player 9 inputs a new instruction via the input device 16, and progresses the game. Then processing advances to step S005.

In step S005, it is judged whether the game ends or not. If the game does not end (the game continues), processing advances to step S001. In other words, the processing depicted in this flow chart is executed repeatedly for each frame until the game ends. If the game ends, the processing depicted in this flow chart ends.

Figure 4:
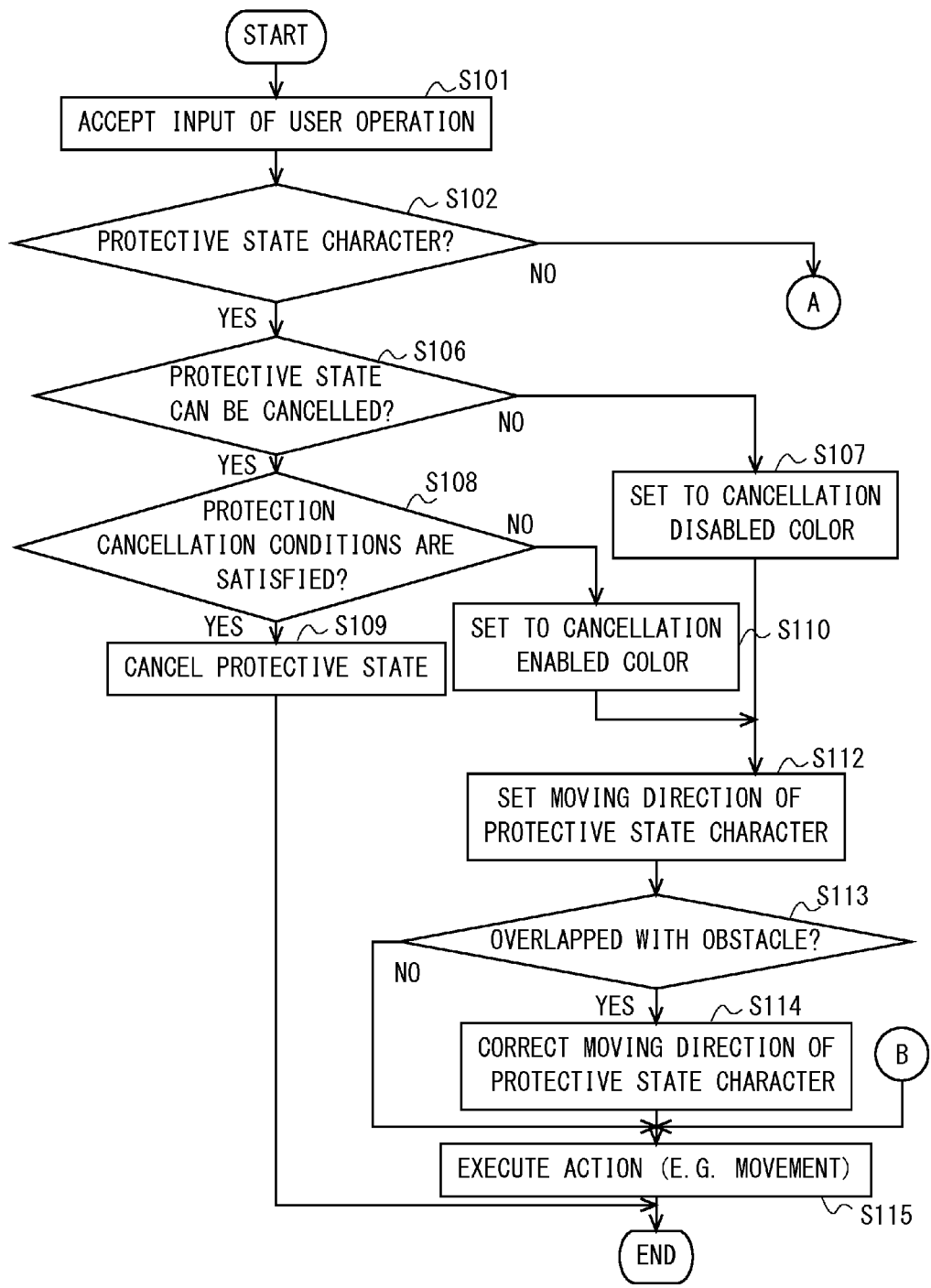
FIG. 4 is a flow chart A depicting a flow of game processing according to the embodiment.
Figure 5:
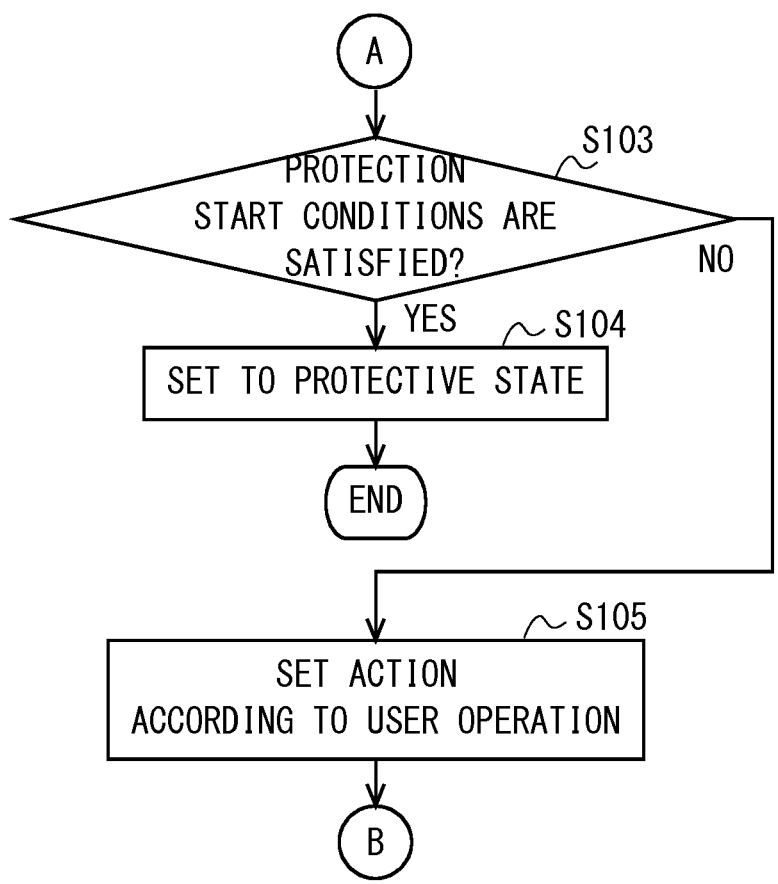
FIG. 5 is a flow chart B depicting a flow of game processing according to the embodiment.

FIG. 4 and FIG. 5 are flow charts depicting the flow of the game processing according to this embodiment. As mentioned above, the processing depicted in these flow charts is to further describe the game processing in step S001 in the information processing depicted in FIG. 3. The game processing depicted in FIG. 4 and FIG. 5 is executed for each player character 41 that appears in the game. In other words, if four players 9A, 9B, 9C and 9D are playing the game, the game processing in FIG. 4 and FIG. 5 is executed four times in each frame.

Player operation input is received in step S101. The information processing device 1 receives the operation input by the player 9 via the input device 16 assigned to each player 9, and the control unit 10 stores the player operation via the input device 16 corresponding to the processing target character as an instruction to the character. Then processing advances to step S102.

In step S102, it is judged whether the character is in the protective state. The control unit 10 judges whether the processing target character is in the protective state where the character is protected from a danger in the game. In concrete terms, a flag to indicate whether the character is in the protective state or not is set for each character in advance, and this flag is referred to for this judgment, for example. The judgment method, however, is not limited to this example. If the target character is in the protective state, processing advances to step S106. If the target character is not in the protective state, on the other hand, processing advances to step S103.

Figure 6:
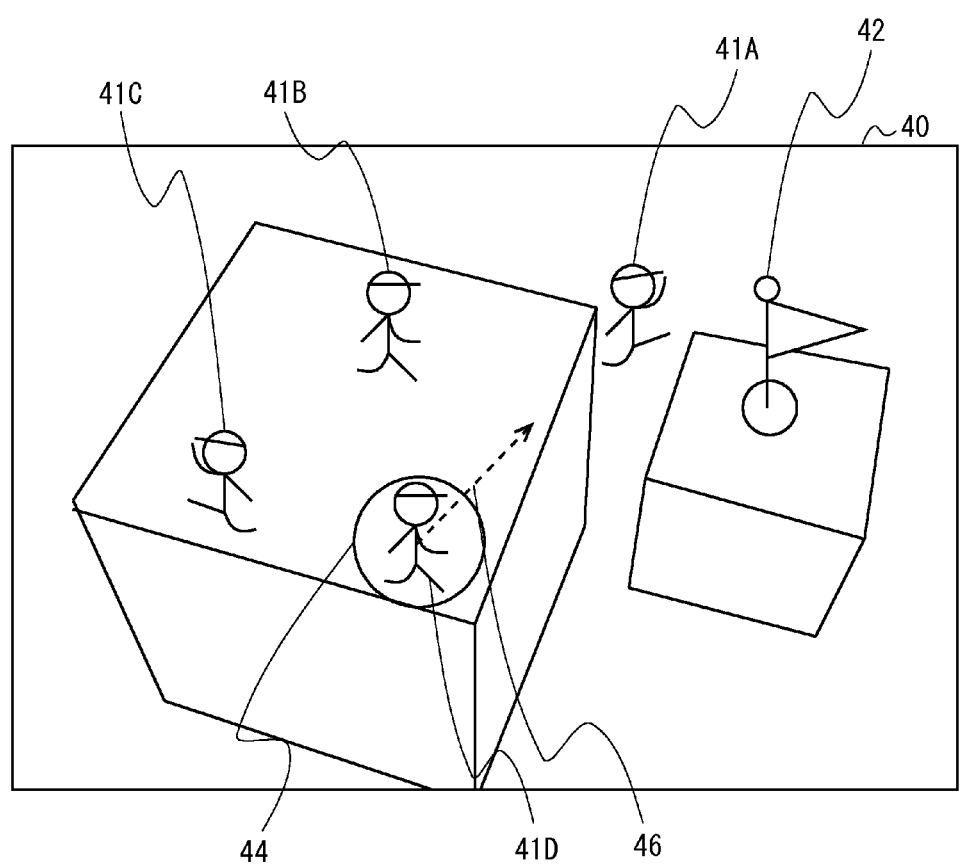
FIG. 6 is a diagram A depicting a display image of a game according to the embodiment.

FIG. 6 is a diagram depicting a display image 40 of a game according to this embodiment. Four player characters 41A, 41B, 41C and 41D, who move toward a goal 42 indicated by a flag in the virtual world, are displayed on the display image 40 in FIG. 6. The protective state notifying unit 26 attaches an effect to a character in the protective state to let players 9 know that this character is in the protective state. In this embodiment, a sphere (bubble) 44 enclosing the character 41D in the protective state is displayed as an effect to indicate the protective state. This sphere 44 is transparent, and the character enclosed by the sphere 44 can be seen by the players 9.

In step S103, it is judged whether a predetermined protection start condition is satisfied. The protecting unit 22 judges whether any one of the protection start conditions is satisfied, referring to the various parameters used in the game processing and the content of the player operation received in step S101. For example, the protection start conditions that are set in this embodiment are:

(1) a predetermined time has elapsed since the target characters leaves the display image 40;
(2) a character who was sidelined by an enemy attack, a trap, a fall or the like is revived;
(3) target character moved away from the leading character for a predetermined distance or more; and
(4) player operation to instruct the start of protection is inputted in a state where the target character is on the ground (is not in the air).

The protection start conditions, however, are not limited to the examples of this embodiment. If it is judged that a protection start condition is satisfied, processing advances to step S104. And if it is judged that no protection start condition is satisfied, processing advances to step S105.

In step S104, the target character who satisfies a predetermined protection start condition is set to the protective state. If it is judged that a protection start condition is satisfied in step S103, the protecting unit 22 sets the target character to the protective state. This setting is carried out by setting a flag to TRUE, which indicates the protective state, for example. As mentioned above, in this embodiment, the character in the protective state is not influenced by an enemy attack, a trap, a fall or any other danger during the game. The character in the protective state automatically follows the leading character during the game. If the target character is set to the protective state, the processing depicted in this flow chart ends.

In step S105, an action of the character is set according to the player operation. The action setting unit 23 sets an action of the target character according to the player operation received in step S101. The action of the character includes movement (including jumping) of the character in the virtual world of the game, an attack operation, a defensive operation and use of an item. If the action is a movement of the character, the game processing determines the moving direction and the moving velocity of the character on the basis of the player operation and the parameters of the target character. The moving direction and the moving velocity are expressed as a velocity vector in the later mentioned preferential display character determination processing (see FIG. 11). If the action of the target character is set, processing advances to step S115.

In step S106, it is judged whether the protective state of the character can be cancelled (whether the character can return to the normal state). The cancellation limiting unit 28 judges whether the target character who was judged as in the protective state in step S102 is in a situation where the protective state can be cancelled. In this embodiment, it is judged that the protective state can be cancelled when the position of the target character is not overlapping with the object (obstacle) obstructing the movement of the character in the virtual world of the game. This is because, even if the protective state is cancelled in a state of overlapping with the obstacle, the character cannot be moved by the obstruction of the obstacle, or the character is immediately damaged and defeated. If it is judged that the protective state cannot be cancelled (character cannot return to the normal state), processing advances to step S107. If it is judged that the protective state can be cancelled (the character can return to the normal state), processing advances to step S108.

In step S107, the color of the sphere 44 enclosing the target character is set to a color to indicate that cancellation of the protective state is disabled. In response to the judgment in step S106 that the protective state of the target character cannot be cancelled, the protective state notifying unit 26 sets the color of the sphere 44 enclosing the target character to a color of which degree of transparency is low, so as to notify the player 9 that the protective state cannot be cancelled. For this color, a color close to a theme color (a unique color predetermined for each character) of the character may be used (e.g. red if the character is wearing red clothing). If a color close to the theme color of the character is used for the color of the sphere 44, the player 9 can discern the character in the sphere 44 even if the character becomes invisible in the sphere 44 which became less transparent. Then processing advances to step S112.

In step S108, it is determined whether a predetermined protection cancellation condition is satisfied (target character returns to the normal state). The information processing device 1 judges whether any one of protection cancellation conditions is satisfied, referring to various parameters used in the game processing and the content of the player operation received in step S101. For example, the protection cancellation conditions in this embodiment are:
(1) another character performed an action to cancel the protective state (breaking the sphere 44) to the character in the protective state; and
(2) a player operation to instruct to cancel protection is inputted.
The protection cancellation conditions, however, are not limited to the examples of this embodiment. If it is judged that a protection cancellation condition is satisfied, processing advances to step S109. If it is judged that no protection cancellation condition is satisfied, processing advances to step S110.

In step S109, the protective state of the target character who satisfied the protection cancellation condition is cancelled (target character returns to the normal state). If it is judged that the protection cancellation condition is satisfied, the cancelling unit 27 cancels the protective state of the target character. The protective state is cancelled by such a method as setting a flag to indicate the protective state to FALSE. If the protective state of the target character is cancelled, the processing depicted in this flow chart ends.

In step S110, the color of the sphere 44 enclosing the target character is set to a color to indicate that cancellation of the protective state is enabled. In response to the judgment in step S106 that the protective state of the target character can be cancelled, the protective state notifying unit 26 sets the color of the sphere 44 enclosing the target character to a color of which degree of transparency is high, so as to notify the player 9 that the protective state can be cancelled. Then processing advances to step S112.

In step S112, the moving direction of the character in the protective state is set. In this embodiment, the character in the protective state automatically moves regardless the player operation. While movement of the character in the normal state is interrupted by an obstacle in the virtual world, the character in the protective state can move past an obstacle without being interrupted by it. The action setting unit 23 sets the moving direction of the character in the protective state to the direction 46 toward the leading character on the basis of the position of the character in the protective state in the virtual world and the position of the leading character. In the example in FIG. 6, the moving direction of the character 41D in the protective state is set to the direction 46 toward the character 41, which is the leading character. This is because the protective state is cancelled by the leading character (in this embodiment, the sphere 44 to indicate the protective state is shattered by the leading character), and the game restarts from a position close to the leading character. The way of determining the leading character will be described later with reference to FIG. 12. Then processing advances to step S113.

In step S113, it is judged that the character in the protective state is overlapping an obstacle. The obstacle detecting unit 24 judges whether the position of the target character in the protective state is overlapping with an object (obstacle) to obstruct the movement of the character in the virtual world of the game. If it is judged that the character in the protective state is overlapping with the obstacle, processing advances to step S114. If it is judged that the character in the protective state is not overlapping with the obstacle, processing advances to step S115.

In step S114, the moving direction of the character in the protective state is corrected. If it is judged that the character in the protective state is overlapping with the obstacle, the correcting unit 25 corrects the moving direction of the target character in the protective state to a direction to escape the state of overlapping with the object most quickly (this is direction 48, which is described later with reference to FIG. 7). This is because it may take time to enter the state where the protective state can be cancelled, if the target character overlapping with the obstacle moves toward the leading character.

Figure 7:
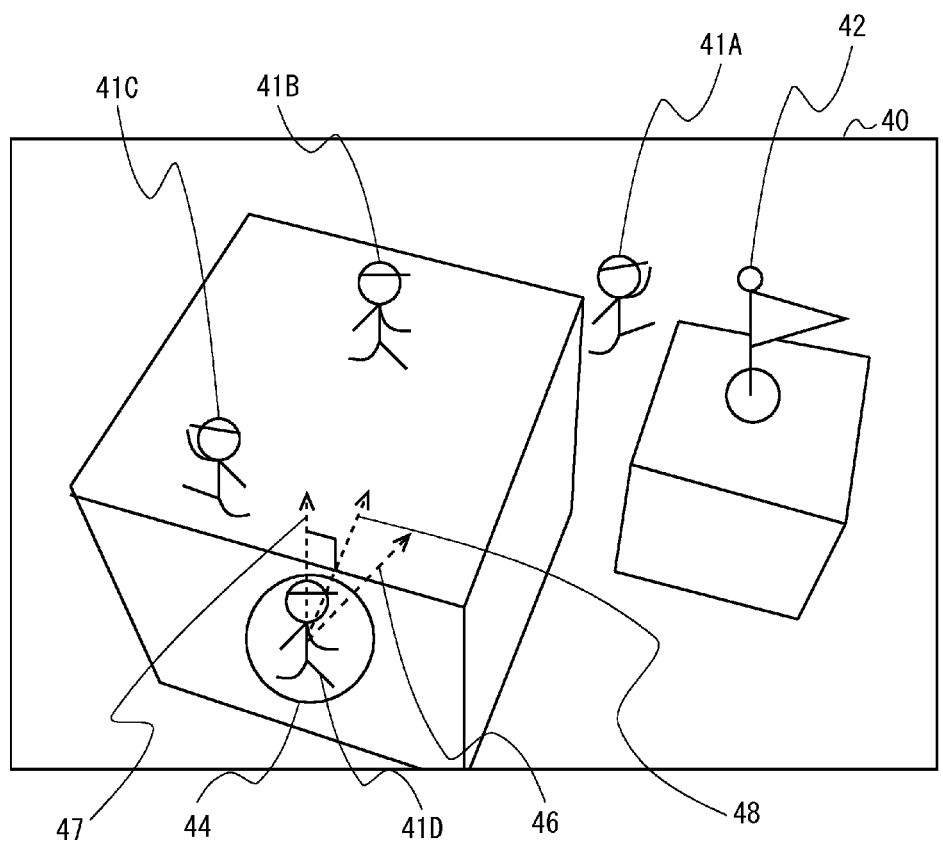
FIG. 7 is a diagram B depicting a display image of the game according to the embodiment.

FIG. 7 is a diagram depicting a display image 40 of a game according to this embodiment. In this embodiment, the correcting unit 25 corrects the moving direction of the target character in the protective state to a composite direction 48, combining the direction 46 to the leading character which was set in step S112 and the normal line direction 47. Here the normal line direction 47 is a direction toward outside the obstacle on a normal line of a boundary surface closest to the target character (boundary surface between an obstacle which disables movement of the character and a space where movement of the character is enabled). The direction of correction, however, is not limited to the composite direction 48. For example, the moving direction of the character in the protective state may be corrected simply in the normal line direction 47. Then processing advances to step S115.

In step S115, action processing of the character is executed. The game processing unit 21 executes processing for the target character to perform an action, such as movement, in the virtual world, according to the action (including movement) of the target character which was set in step S105, step S112 or step S114. The result of the processing is drawn in the drawing processing in step S003, which is executed after the processing depicted in this flow chart ends, and is displayed in step S004 (see FIG. 3). Then the processing depicted in this flow chart ends, and processing advances to step S002 in FIG. 3.

Figure 8:
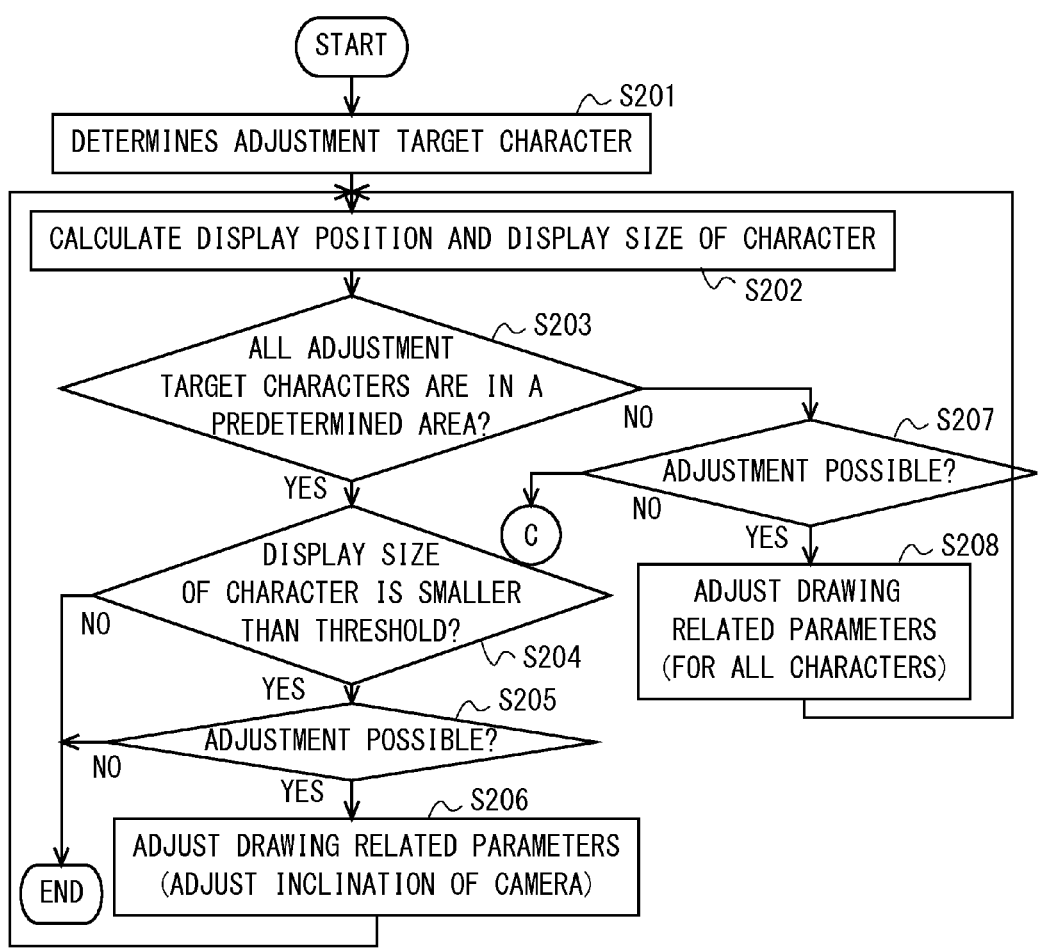
FIG. 8 is a flow chart A depicting a flow of drawing related parameter setting processing according to the embodiment.
Figure 9:
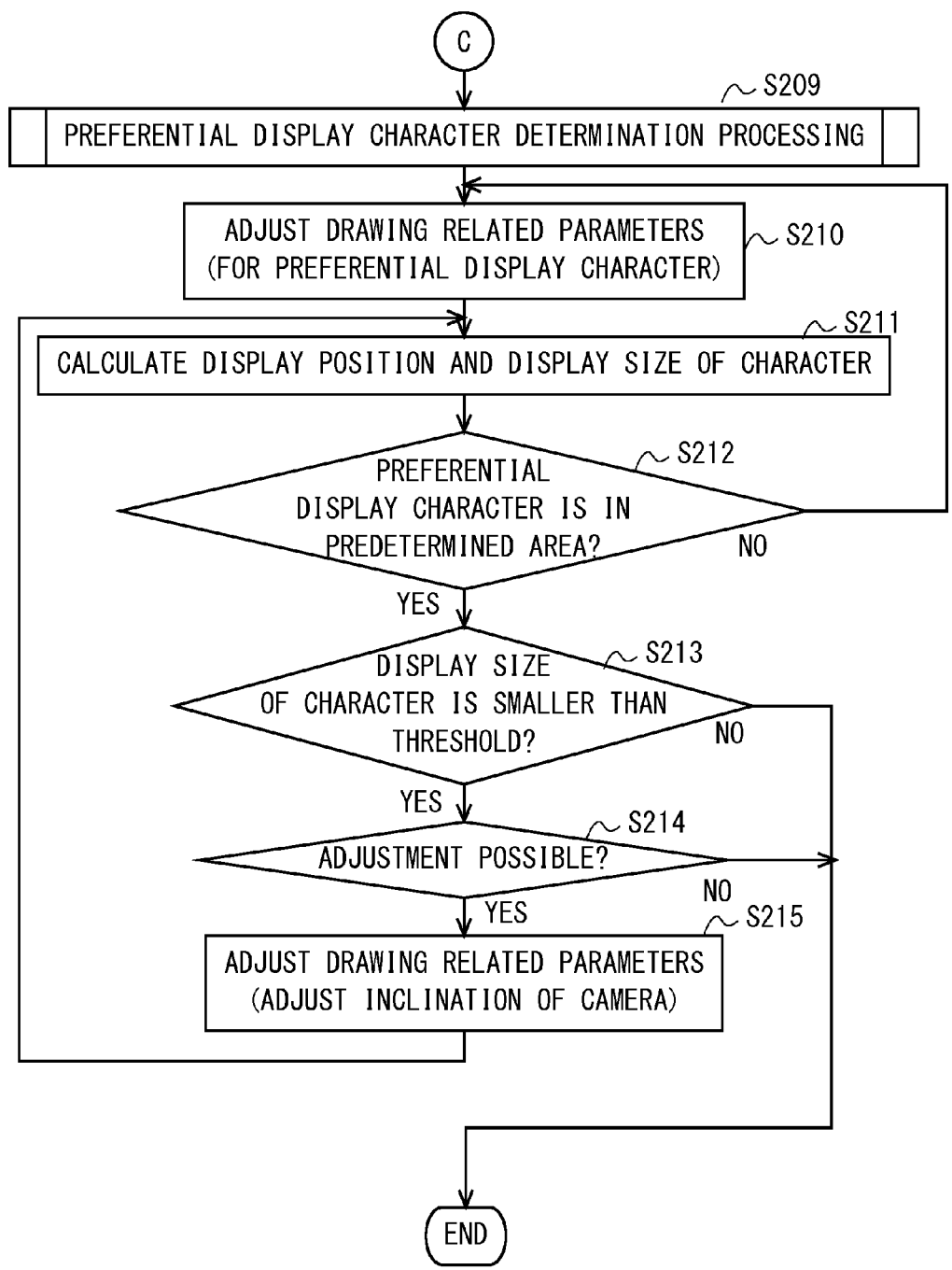
FIG. 9 is a flow chart B depicting a flow of drawing related parameter setting processing according to the embodiment.

FIG. 8 and FIG. 9 are flow charts depicting the flow of the drawing related parameter setting processing according to this embodiment. As mentioned above, the processing depicted in these flow charts is to further describe the drawing related parameter setting processing in step S002 in the information processing in FIG. 3.

In step S201, a target player character 41 for which the drawing related parameters are adjusted is determined. The excluding unit 31 excludes characters in a predetermined state, such as a character which was lost (died) in the game, and a character in the protective state, from the targets of adjusting the drawing related parameters, and sets the other characters as targets of adjustment of the drawing related parameters. Then processing advances to step S202.

In step S202, the display position and the display size of the player character 41 to be the target of adjusting the drawing related parameters are calculated. The display position calculating unit 29 calculates the display position and the display size of the adjustment target character determined in step S201 in the display image 40, in the case when the virtual world is drawn according to the currently set drawing related parameters. In this embodiment, actual drawing is not performed, but the display position and the display size according to the drawing related parameters are calculated. However, actual drawing processing may be executed in order to acquire the display position and the display size. In this embodiment, the display position and the display size are calculated after the adjustment target character is determined, but the adjustment target character may be determined after calculating the display position and the display size for all the player characters 41A, 41B, 41C and 41D first. (In other words, the processing sequence of step S201 and step S202 may be reversed.) If the virtual world is a three-dimensional virtual space, the display position calculating unit 29 calculates the display position and the display size in the two-dimensional display image 40. Then processing advances to step S203.

In step S203, it is determined whether all the adjustment target characters are in a predetermined area 45. The adjusting unit 30 refers to the display position calculated in step S202, and judges whether all the adjustment target characters are located in the predetermined area 45 defined in the display image 40.

Figure 10:
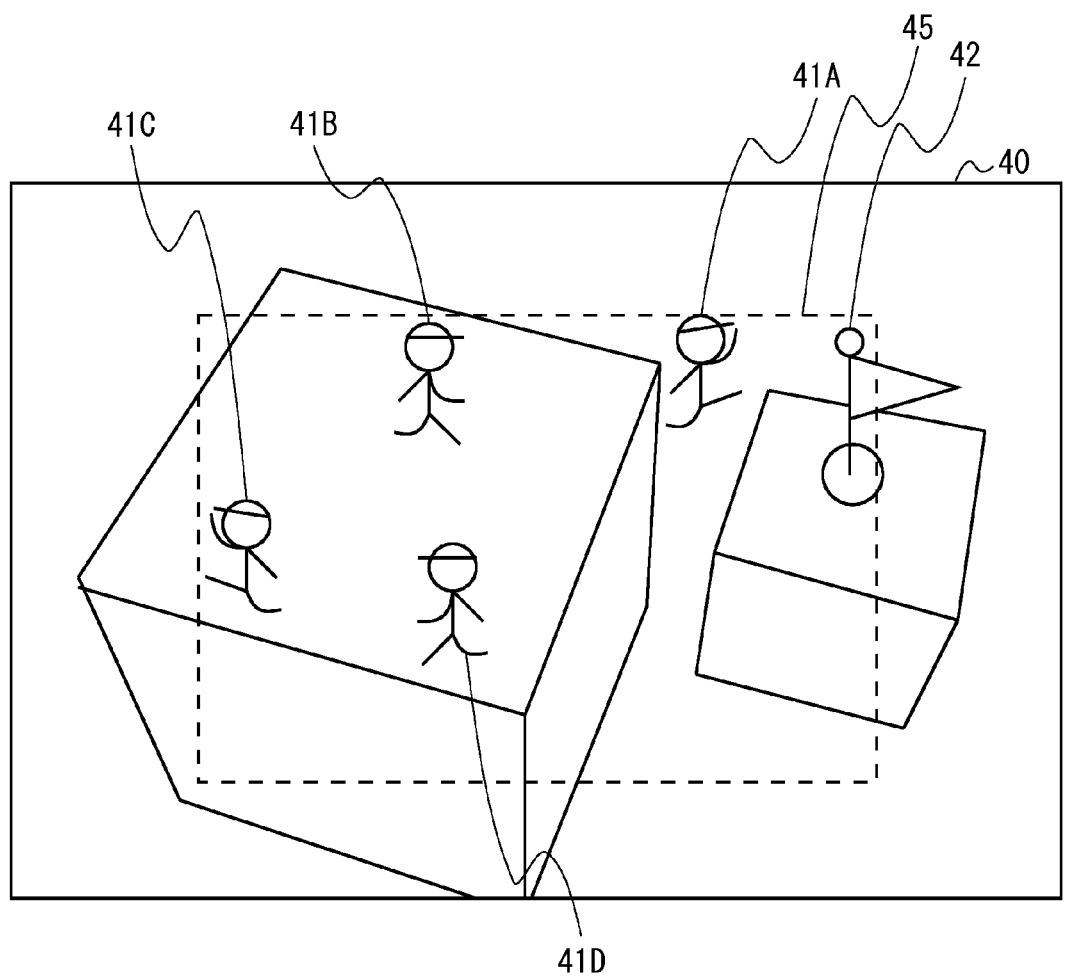
FIG. 10 is a drawing depicting a predetermined area that is set in a display image according to the embodiment.

FIG. 10 is a diagram depicting a predetermined area 45 that is set in the display image 40 according to this embodiment. In the display image 40 in FIG. 10, four player characters 41A, 41B, 41C and 41D, who move in the virtual world, are displayed. Here the frame indicated by the broken line is a frame indicating the predetermined area 45 described above, and is not actually drawn in the display image 40 (therefore is not displayed). The adjusting unit 30 adjusts the drawing related parameters so that the characters enter into this frame (predetermined area 45). In this embodiment, an area, which is smaller than the entire display image 40 and which is set in a position including the center of the entire display image 40, is set as the predetermined area 45. By setting this area, not only the characters but also the state around the characters can be appropriately displayed so that the players 9 can recognize the entire picture.

The predetermined area 45, however, is not limited to the example of this embodiment. For example, the predetermined area 45 may be the entire display image 40. In the example of this embodiment, the center of the display image 40 and the center of the predetermined area 45 match, but the center of the display image 40 and the center of the predetermined area 45 may not match. For example, in the case of a game where the scroll direction is predetermined, the center of the predetermined area 45 may be behind the center of the display image 40, so that more space is created in the advancing direction of the characters.

If it is judged that all the adjustment target characters are within the predetermined area 45 as a result of the judgment by the adjusting unit 30, processing advances to step S204. And if it is not judged that all the adjustment target characters is within the predetermined area 45 (if it is judged that any one of the adjustment target characters is outside the predetermined area 45), processing advances to step S207.

In step S204, the display size of the adjustment target character is checked and it is determined whether the display size is smaller than a threshold. The adjusting unit 30 compares the display size of the adjustment target character calculated in step S202 with a predetermined threshold. If it is judged that the display sizes of all the adjustment target characters are the threshold or more, the drawing related parameter setting processing depicted in this flow chart ends, and processing advances to step S003 in FIG. 3. On the other hand, if it is judged that the display size of any one of the adjustment target characters is less than the threshold, then processing advances to step S205.

In step S205, it is judged whether the drawing related parameters can be adjusted. In response to the judgement in step S204 that the display size of any one of the adjustment target characters is less than the threshold, the adjusting unit 30 refers to the current setting content of the drawing related parameters, and judges whether various parameters have reached the limit of the setting tolerance which is set in advance. In this embodiment, the inclination of the virtual camera is adjusted in order to adjust the display size. Therefore the adjusting unit 30 refers to the current inclination of the virtual camera, and judges whether the fixation point of the virtual camera determined by the current inclination is directed to the adjustment target character, in other words, whether the adjustment target character can be drawn in the center of the display screen. If the parameters have reached the limit of the setting tolerance (that is, if the fixation point of the virtual camera has already been directed to the adjustment target character), the processing depicted in this flow chart ends, judging that the display size of the adjustment target character can no longer be increased by adjusting the parameters. If the parameters have not reached the limit of the setting tolerance (adjustment is possible), on the other hand, processing advances to step S206.

In step S206, the drawing related parameters are adjusted. If it is judged that the display size of any one of the adjustment target characters is less than the threshold in step S204, and if it is judged that the parameters can be adjusted in step S205, the adjusting unit 30 adjusts the inclination of the virtual camera for drawing so that the fixation point moves closer to the adjustment target character. This is because if the display size of the player character 41 becomes too small, the player 9 has difficulty in visually recognizing the character 41 even if the character 41 is displayed in the display image 40. If the inclination of the virtual camera is changed, the processing returns to step S202, since any one of the adjustment target characters may be disposed outside of the predetermined area 45.

In step S207, it is judged whether the drawing related parameters can be adjusted. In response to the judgment in step S203 that any one of the adjustment target characters is outside the predetermined area 45, the adjusting unit 30 refers to the current setting content of the drawing related parameters, and judges whether the various parameters have reached the limit of the setting tolerance which is set in advance. The setting tolerance is a predetermined range of parameter values that can be set, such as a position, an inclination and an angle of view of the virtual camera and for example a setting tolerance that is determined so that the target character does not enter an area inside the obstacle in the virtual space, and a setting tolerance that is determined so that the virtual camera is not apart from the character exceeding a predetermined distance, are set. If any one of the parameters reaches a limit of the setting tolerance, processing advances to step S209, judging that all the adjustment target characters cannot be displayed in the predetermined area 45 by adjusting the parameters. If no parameters have reached the setting tolerance, on the other hand, processing advances to step S208.

The drawing related parameters are adjusted in step S208 so that all the adjustment target characters are disposed within the display area. If no parameters have reached the limit of the setting tolerance, the adjusting unit 30 adjusts the drawing related parameters so that the display positions of all the adjustment target characters are disposed within the predetermined area 45. The drawing related parameters adjusted here include parameters for determining the position, inclination, and angle of view of the virtual camera in the virtual space, and the adjusting unit 30 performs the adjustment to change the position, inclination and angle of view of the virtual camera to the direction toward a character disposed outside the predetermined area 45, for example. Then processing advances to step S202. This is because any one of the adjustment target characters may be disposed outside the predetermined area 45 by adjusting the parameters. In other words, the adjustment processing in step S208 is executed repeatedly until either all of the characters are disposed within the predetermined frame, or processing advances to the preferential character determination processing, which will be described later. However an upper limit may be set for the number of repeats.

In step S209, the preferential display character determination processing is executed. In response to the judgment in step S207 that all the adjustment characters cannot be displayed in the predetermined area 45, the preferential display character determining unit 35 determines a character which is preferentially displayed in the predetermined area 45. Details on the preferential display character determination processing related to step S209 will be described later with reference to FIG. 11. Then processing advances to step S210.

In step S210, the drawing related parameters are adjusted so that the preferential display character is disposed in the predetermined area 45. The adjusting unit 30 adjusts the drawing related parameters so that the preferential display character display position determined in the preferential display character determination processing in step S209 is disposed in the predetermined area 45. The drawing related parameters adjusted in this step is the same as in step S208. Then processing advances to step S211.

In step S211, the display position and the display size of the preferential display character are calculated. The display position calculating unit 29 calculates the display position and the display size of the preferential display character in the display image 40 in the case when the virtual world is drawn according to the drawing related parameters adjusted in step S210. Details on the calculation processing is generally the same as the processing described in step S202. Then processing advances to step S212.

In step S212, it is judged whether the preferential display character is located in the predetermined area 45. Referring to the display position calculated in step S211, the adjusting unit 30 judges whether the preferential display character is located in the predetermined area 45 defined in the display image 40. If it is judged that the preferential display character is located in the predetermined area 45 as a result of the judgment, processing advances to step S213. If it is judged that the preferential display character is disposed outside the predetermined area 45, processing advances to step S210. In other words, the adjustment processing in step S210 is executed repeatedly until the preferential display character is disposed within the predetermined frame. However an upper limit may be set for the number of repeats.

In step S213, the display size of the preferential display character is checked, and it is judged whether the display size is smaller than the threshold. Details on the processing are generally the same as the description in step S204. If it is determined that the display size of the preferential display character is the threshold or more, the drawing related parameter setting processing depicted in this flow chart ends, and processing advances to step S003 in FIG. 3. If it is judged that the display size of the preferential display character is smaller than the threshold, on the other hand, processing advances to step S214.

In step S214, it is judged whether the drawing related parameters can be adjusted. Details on the processing are generally the same as the description in step S207. If the parameters have reached the limit of the setting tolerance, the processing depicted in this flow chart ends. If the parameters have not been reached the limit of the setting tolerance (the parameters can be adjusted), on the other hand, processing advances to step S215.

In step S215, the drawing related parameters are adjusted. Details on the processing are generally the same as the description in step S206. If the inclination of the virtual camera is changed, processing returns to step S211.

In this way, the processing from step S210 to step S215 is repeated as required, and the processing depicted in this flow chart ends when the preferential display character is disposed within the predetermined area 45, and the display size of the preferential display character becomes a threshold or more.

Figure 11:
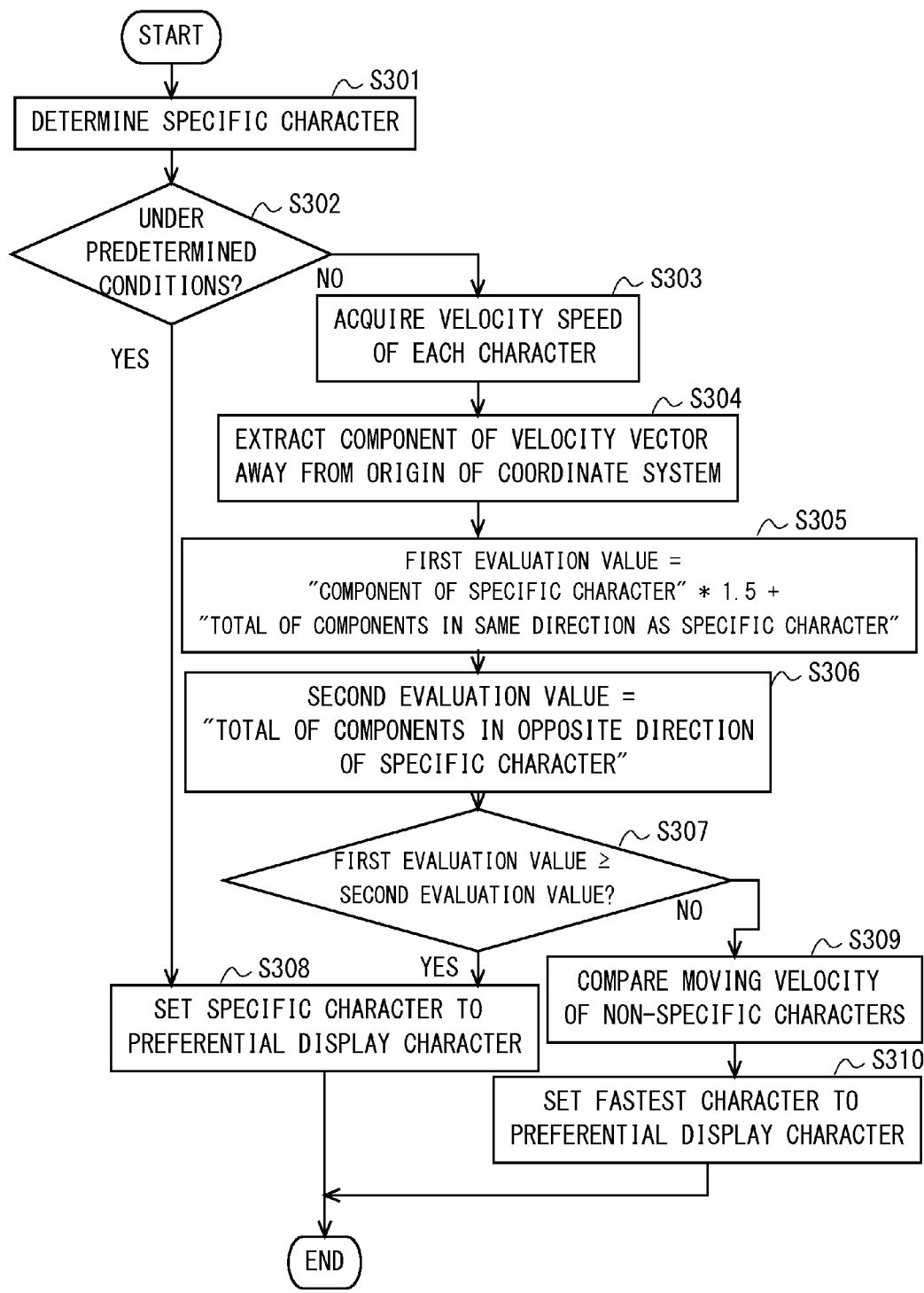
FIG. 11 is a flow chart depicting a flow of preferential display character determining processing according to the embodiment.

FIG. 11 is a flow chart depicting the flow of the preferential display character determination processing according to this embodiment. As mentioned above, the processing depicted in this flow chart is to further describe the preferential display character determination processing in step S209 in the information processing in FIG. 9.

In step S301, a specific character is determined. The specifying unit 32 determines a leading character according to the position of the player character 41, and sets the leading character as the specific character in the subsequent processing. In this embodiment, the subsequent process will be described based on the assumption that the character 41A is determined as the specific character. Then processing advances to step S302.

Figure 12:
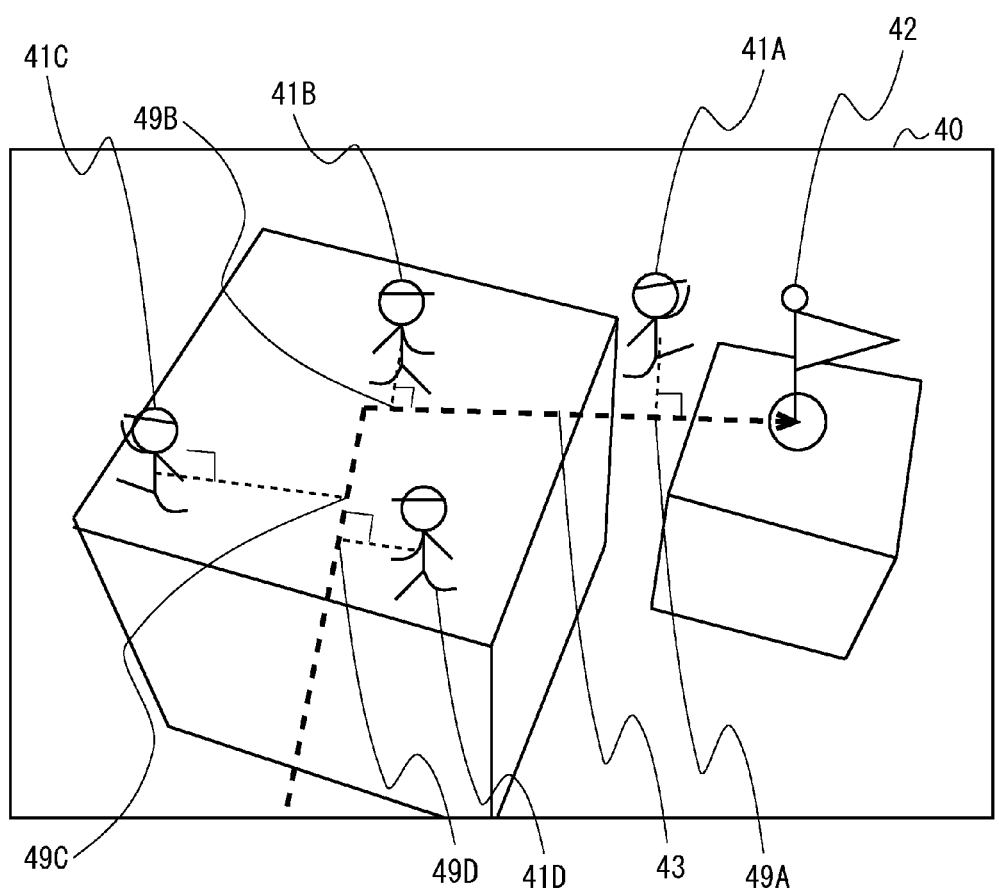
FIG. 12 is a drawing C depicting a display image of the game according to the embodiment.

FIG. 12 is a diagram depicting a display image 40 of a game according to this embodiment. The bold broken line with an arrow extending toward the goal 42 is a progress route 43 of the game, which is predetermined in the virtual world, and is not drawn (therefore is not displayed) on the display image 40. The player character 41 need not progress along the progress route 43, but the progress route 43 is referred to when the degree of progress (closeness to the goal 42) of the player character 41 is calculated. In this example, the leading character is determined on the basis of the progress route 43. In concrete terms, the specifying unit 32 calculates points 49A to 49D on the progress route 43 closest to each character (contact point of a circle around each character and the progress route 43), and determines a character of which point 49A to 49D is closest to the goal 42 on the progress route 43 as the leading character (character 41A in the case of the example in FIG. 12). The method for determining the leading character, however, is not limited to the method of this embodiment. For example, a character of which distance from the goal 42 is closest may be determined as the leading character.

In step S302, it is judged whether the game is under a predetermined state. The specific state detecting unit 33 refers to various parameters used for the game processing and the positions of the characters in the virtual world, so as to detect that the game is in any one of the predetermined states. The predetermined states are, for example:
(1) the specific character is within a predetermined range from the goal 42 (approaching the goal 42); and
(2) the game does not progress unless all the characters advances in a same direction (e.g. characters are climbing up a ladder).
If it is detected that the game is in any one of the predetermined states, processing advances to step S308, and the specific character is determined as the preferential display character (step S308). If it is not detected that the game is in the predetermined state, processing advances to step S303.

In step S303, the velocity vectors of the respective player characters 41A, 41B, 41C and 41D are acquired. The control unit 10 converts the moving direction and the moving velocity of each of the player characters 41A, 41B, 41C and 41D in the virtual world of the game determined in step S105 in FIG. 5 into the moving direction and the moving velocity of each of the player characters 41A, 41B, 41C and 41D on the display image 40. Here the moving direction and the moving velocity on the display image 40 are expressed by a vector on a two-dimensional coordinate system, where the x axis and the y axis are disposed on a plane of the display image 40, of which origin is a predetermined point in the display image 40 (the center of the display image 40 that is also the center of the predetermined area 45 in this embodiment).

Figure 13:
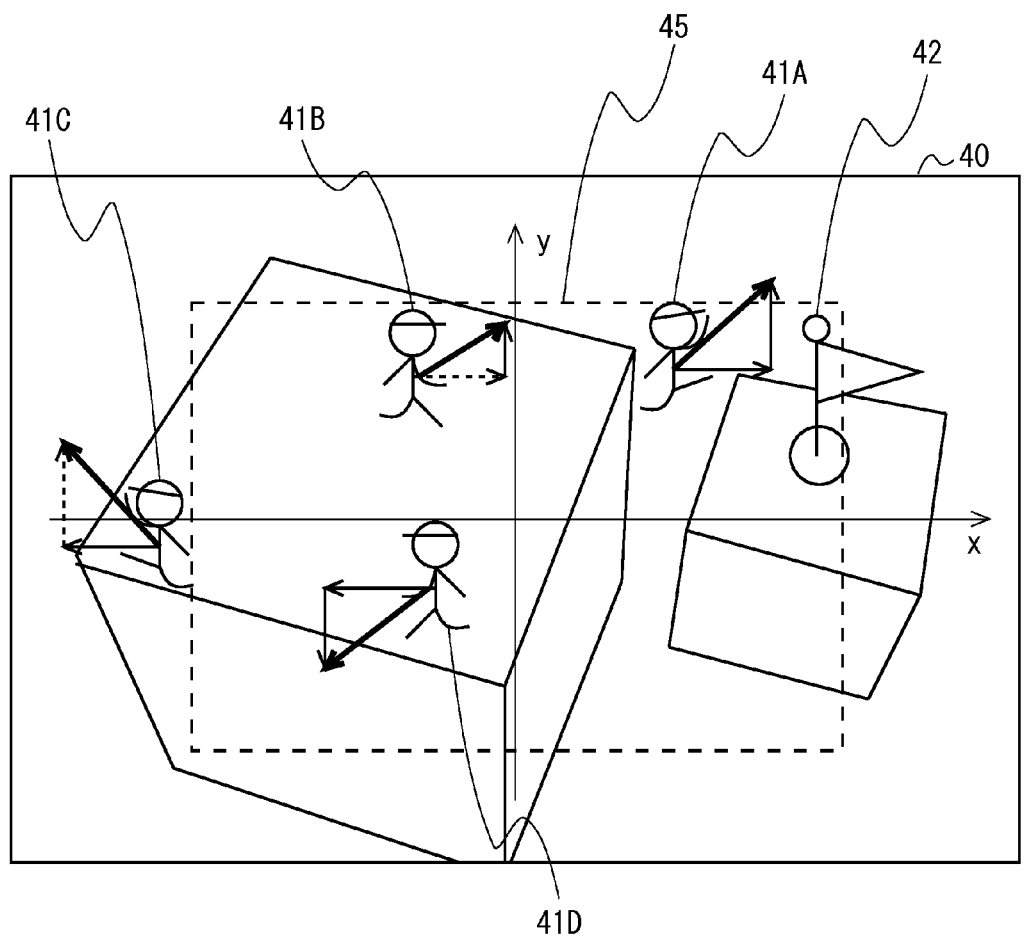
FIG. 13 is a diagram depicting a velocity vector of each character in a display image according to the embodiment.

FIG. 13 is a diagram depicting a velocity vector of each character on the display image 40 according to this embodiment. Four player characters 41A, 41B, 41C and 41D who move in the virtual world are displayed on the display image 40 in FIG. 13. The frame indicated by the broken line here is a frame to indicate the predetermined area 45, just like FIG. 10, and is not drawn on the display image 40. The x and y coordinate axes, of which origin is the center of the predetermined area 45 and the display position and the velocity vector of each character, are shown in FIG. 13. (The coordinate axes and the velocity vectors are not drawn (there not displayed). For the display position of each character, the position calculated in step S202 can be used. A vector has an x component and a y component. In the case of the example in FIG. 13, character 41A: the coordinates of the display portion are a positive x coordinate and a positive y coordinate, and the velocity vector has a positive x component and a positive y component;
character 41B: the coordinates of the display position are a negative x coordinate and a positive y coordinate, and the velocity vector has a positive x component and a positive y component;
character 41C: the coordinates of the display position are a negative x coordinate and a negative y coordinate, and the velocity vector has a negative x component and a positive y component; and
character 41D: the coordinates of the display position are a negative x coordinate and a negative y coordinate, and the velocity vector has a negative x component and a negative y component.

Then processing advances to step S304.

In step S304, a component that moves away from the origin of the coordinate system is extracted. The control unit 10 extracts components having a velocity that moves away from a predetermined point in the display image 40, that is, the origin of the coordinate system (the center point of the predetermined area 45 in this embodiment), out of the components of the velocity vector acquired in step S303. In concrete terms, a component of the velocity vector of which positive/negative matches with that of the display position of the character is extracted for the x axis and the y axis respectively. In the case of the example in FIG. 13, character 41A: a positive x component and a positive y component are extracted out of the velocity vector, since the coordinates of the display position are a positive x coordinate and a positive y coordinate;
character 41B: a positive y component is extracted out of the velocity vector since the coordinates of the display position are a negative x coordinate and a positive y coordinate;
character 41C: a negative x component is extracted out of the velocity vector since the coordinates of the display position are a negative x coordinate and a negative y coordinate; and
character 41D: a negative x component and a negative y component are extracted out of the velocity vector since the coordinates of the display position are a negative x coordinate and a negative y coordinate.

In other words, in step S304, a component having velocity to approach the center point of the predetermined area 45 (a component indicated by the broken line in FIG. 13) is excluded from the components of each velocity vector. This is because this component is a component that indicates movement that remains in the currently drawn range, and can therefore be ignored in adjustment of the drawing related parameters (adjustment of the virtual camera). By excluding these components, components that indicate movement to the direction away from the currently drawn range, which must be focused on to adjust the drawing related parameters, can be extracted. Then processing advances to step S305.

In step S305, a first evaluation value, which indicates a degree of movement toward the moving direction of the specific character, is calculated for the plurality of characters 41. The control unit 10 weights each component of the velocity vector of the specific character (multiplies the velocity vector by 1.5 in this embodiment), out of the components of the velocity vectors extracted in step S304. Then out of the components of the velocity vectors of the other player characters 41 extracted in step S304, the control unit 10 adds the component in the same direction as that of the specific character (y component of the character 41B in the case of the example in FIG. 13) to each weighted component of the velocity vector of the specific character. The judging unit 34 regards the value acquired like this as the first evaluation value. In the case of the example in FIG. 13, the first evaluation value is a velocity vector expressed by "x component=x component of character 41A*1.5" and "y component=y component of character 41A*1.5+y component of character 41B". Then processing advances to step S306.

In step S306, a second evaluation value, which indicates a degree of movement toward the moving direction which is different from that of the specific character, is calculated for the plurality of characters 41. Out of the components of the velocity vectors of the other player characters 41 extracted in step S304, the control unit 10 integrates (sums up) a component in a different direction from that of the specific character (x component of the character 41C and x component and y component of the character 41D in the case of the example in FIG. 13). The judging unit 34 regards the value acquired like this as the second evaluation value. In the case of the example in FIG. 13, the second evaluation value is the velocity vector expressed by "x component=x component of the character 41C+x component of the character 41D" and "y component=y component of the character 41D". Then processing advances to step S307.

In step S307, it is judged whether the first evaluation value is the same as or greater than the second evaluation value. The judging unit 34 compares the first evaluation value that is calculated in step S305 and indicates the degree of movement toward the moving direction of the specific character, and the second evaluation value that is calculated in step S306 and indicates the degree of movement toward a moving direction which is different from that of the specific character. If it is judged that the first evaluation value is the same as or greater than the second evaluation value, processing advances to step S308. If it is judged that the first evaluation value is less than the second evaluation value, on the other hand, processing advances to step S309.

In step S308, the specific character is determined as the preferential display character. If it is judged that the first evaluation value is the same as or greater then the second evaluation value, the preferential display character determining unit 35 determines the specific character as the preferential display character.

Thereby when a plurality of player characters 41, other than the specific character, are performing actions which are different from that of the specific character, it can be judged whether there is commonality in these actions (movement in this embodiment). The velocity vector components of the specific character are weighted with a predetermined value (1.5 times in this example), hence if another character starts to move toward a direction which is different from that of the specific character, it is highly probable that the specific character becomes the preferential display character, except in the case when the moving velocity of the specific character is extremely slow. However if a plurality of other characters start to move toward directions which are different from that of the specific character and these moving directions are similar, then the commonality of the movements of the plurality of other characters increases the second evaluation value, which increases the probability that a character other than the specific character becomes the preferential display character. If a plurality of other characters (e.g. characters 41C and 41D) are moving in different directions from that of the specific character, but the moving directions of these characters are completely different from each other (the moving direction of the character 41C and the moving direction of the character 41D are different), then the second evaluation value does not increase.

In step S309 and step S310, a character, of which moving velocity is the fastest among the characters other than the specific character, is determined as the preferential display character. In response to the judgment in step S307 that there is commonality in the actions of a plurality of player characters 41 other than the specific characters which are different from the action of the specific character, the preferential display character determining unit 35 determines one of the plurality of player characters 41 other than the specific character as the preferential display character. In concrete terms, the preferential display character determining unit 35 compares the velocity vectors of a plurality of player characters 41 other than the specific character (step S309), and determines a character having the greatest velocity vector as the preferential display character (step S310). Then the processing depicted in this flow chart ends, and processing advances to step S210 in FIG. 9.

The embodiment described above is merely an example of carrying out the present disclosure, and does not limit the present disclosure to the concrete configuration described above. Any appropriate concrete configuration in accordance with the embodiment may be used to carry out the present disclosure.

What is claimed is:

1. A computer-readable non-transitory medium storing a game program for causing a computer of a game machine that includes a memory device to execute:
    responsive to reception of an electrical signal generated by a sensor in an input device controlled by a user, performing game processing including movement of one or a plurality of characters in a virtual world;
    setting a protective state for protecting at least one character from a danger in a game when predetermined conditions stored in the memory device are satisfied;
    setting a moving direction of the character in the protective state to a predetermined direction;
    programmatically comparing the position of the character in the protective state against the position of objects stored in the memory device which obstruct the movement of the character in the protective state;
    in response to detecting that the character in the protective state is overlapping with an object which obstructs the movement in the virtual world, triggering correcting the moving direction which has been set by the moving direction setting when the detecting detects in response to detecting that the character in the protective state is overlapping with an object which obstructs the movement in the virtual world, triggering correcting the moving direction which has been set by the moving direction setting when the detecting detects an obstacle state, wherein
    when the obstacle state is detected, the correcting corrects the moving direction, which has been set by the moving direction setting, on the basis of a direction to cancel the detected overlapping with an obstacle-object, and wherein
    when the obstacle state is detected, the correcting corrects the moving direction, which has been set by the moving direction setting, on the basis of a normal line direction of a boundary surface of the detected obstacle-object.

2. The computer-readable non-transitory medium storing the game program according to claim 1, wherein
    the correcting involves correcting the moving direction, which has been set by the moving direction setting, on the basis of a direction in which the overlapping with the obstacle-object can be cancelled in the shortest time.

3. The computer-readable non-transitory medium storing the game program according to claim 1, wherein
the correcting involves correcting the moving direction, which has been set by the moving direction setting, on the basis of a direction toward a position closest to a current position of the character in the protective state, out of positions where the overlapping with the obstacle-object is cancelled.

4. The computer-readable non-transitory medium storing the game program according to claim 1, wherein
the game processing includes movement of a plurality of characters, and
the moving direction setting involves setting the moving direction of the character in the protective state to a direction based on a position of any one of the plurality of characters other than the character in the protective state.

5. The computer-readable non-transitory medium storing the game program according to claim 1, wherein
the computer further executes notifying a player that the character is in the protective state, and the content of the notifying is different between when the obstacle detecting is executing detection and when the obstacle detecting is not executing detection.

6. The computer-readable non-transitory medium storing the game program according to claim 5, wherein
the notifying involves notifying the player of the protective state by attaching a predetermined effect to the display of the character, such that an effect which makes it difficult to visually recognize the character is attached while the obstacle detecting is executing detection, and an effect which makes it easy to visually recognize the character is attached while the obstacle detecting is not executing detection.

7. The computer-readable non-transitory medium storing the game program according to claim 6, wherein
the notifying involves notifying the player of the protective state by attaching a predetermined effect to the display of the character, such that an effect which makes the character less transparent is attached while the obstacle detecting is executing detection, and an effect which makes the character more transparent is attached while the obstacle detecting is not executing detection.

8. The computer-readable non-transitory medium storing the game program according to claim 7, wherein
the notifying involves notifying the player of the protective state by attaching, to the display of the characters, an effect of mutually different colors set in advance for the respective characters.

9. The computer-readable non-transitory medium storing the game program according to claim 1, wherein
the computer is caused to further execute:
cancelling the protective state; and
limiting cancellation of the protective state by the cancelling while the obstacle detecting is executing detection.

10. The computer-readable non-transitory medium storing the game program according to claim 9, wherein
the cancelling involves cancelling the protective state when a cancellation operation by a player is detected.

11. The computer-readable non-transitory medium storing the game program according to claim 1, wherein
the protective state setting involves setting the protective state for the character when a protective operation by a player is detected.

12. A game system, comprising a memory device and at least one processor, the processor is configured to execute:
responsive to reception of an electrical signal generated by a sensor in an input device controlled by a user, performing game processing including movement of one or a plurality of characters in a virtual world;
setting a protective state for protecting at least one character from a danger in a game when predetermined conditions stored in the memory device are satisfied;
setting a moving direction of the character in the protective state to a predetermined direction;
programmatically comparing the position of the character in the protective state against the position of objects stored in the memory device which obstruct the movement of the character in the protective state;
in response to detecting that the character in the protective state is overlapping with an object which obstructs the movement in the virtual world, triggering correcting the moving direction which has been set by the moving direction setting when the detecting detects an obstacle state, wherein
when the obstacle state is detected, the correcting corrects the set moving direction, on the basis of a direction to cancel the detected overlapping with an obstacle-object, and wherein
when the obstacle state is detected, the correcting corrects the set moving direction, on the basis of a normal line direction of a boundary surface of the detected obstacle-object.

13. A game processing method for a computer of a game machine that includes a memory device to execute:
responsive to reception of an electrical signal generated by a sensor in an input device controlled by a user, performing game processing including movement of one or a plurality of characters in a virtual world;
setting a protective state for protecting at least one character from a danger in a game when predetermined conditions stored in the memory device are satisfied;
setting a moving direction of the character in the protective state to a predetermined direction; programmatically comparing the position of the character in the protective state against the position of objects stored in the memory device which obstruct the movement of the character in the protective state;
in response to detecting that the character in the protective state is overlapping with an object which obstructs the movement in the virtual world, triggering correcting the moving direction which has been set in the moving direction setting when an obstacle state is detected in the detecting, wherein
when the obstacle state is detected, the correcting corrects the set moving direction, on the basis of a direction to cancel the detected overlapping with an obstacle-object, and wherein
when the obstacle state is detected, the correcting corrects the set moving direction, on the basis of a normal line direction of a boundary surface of the detected obstacle-object.

14. A game machine that includes a memory device and a computer, configured to execute:
responsive to reception of an electrical signal generated by a sensor in an input device controlled by a user, performing game processing including movement of one or a plurality of characters in a virtual world;
setting a protective state for protecting at least one character from a danger in a game when predetermined conditions stored in the memory device are satisfied;

setting a moving direction of the character in the protective state to a predetermined direction;

programmatically comparing the position of the character in the protective state against the position of objects stored in the memory device which obstruct the movement of the character in the protective state;

in response to detecting that the character in the protective state is overlapping with an object which obstructs the movement in the virtual world, triggering correcting the moving direction which has been set by the moving direction setting when the detecting detects an obstacle state, wherein when the obstacle state is detected, the correcting corrects the set moving direction, on the basis of a direction to cancel the detected overlapping with an obstacle-object, and wherein when the obstacle state is detected, the correcting corrects the set moving direction, on the basis of a normal line direction of a boundary surface of the detected obstacle-object.

* * * * *